United States Patent
Yee et al.

(10) Patent No.: US 7,221,312 B2
(45) Date of Patent: May 22, 2007

(54) METHOD AND SYSTEM FOR DETECTING INTERFERENCE FOR GLOBAL POSITIONING SYSTEMS

(75) Inventors: David Moon Yee, Scottsdale, AZ (US); Clinton Charles Hepner, Chandler, AZ (US); Jeffrey Dean York, Gilbert, AZ (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 271 days.

(21) Appl. No.: 10/463,408

(22) Filed: Jun. 18, 2003

(65) Prior Publication Data

US 2004/0257275 A1   Dec. 23, 2004

(51) Int. Cl.
G01S 5/14    (2006.01)

(52) U.S. Cl. .......................... 342/357.02; 342/357.06; 342/357.09

(58) Field of Classification Search ........... 342/357.02, 342/357.06, 357.09, 357.12, 358
See application file for complete search history.

(56) References Cited

U.S. PATENT DOCUMENTS

| | | | |
|---|---|---|---|
| 5,412,390 A | | 5/1995 | Peavey et al. |
| 5,477,730 A | * | 12/1995 | Carter .......................... 73/609 |
| 5,499,388 A | | 3/1996 | Song |
| 5,519,403 A | * | 5/1996 | Bickley et al. ......... 342/357.06 |
| 5,557,284 A | | 9/1996 | Hartman |
| 5,768,319 A | * | 6/1998 | Durboraw, III ........ 342/357.02 |
| 5,847,679 A | * | 12/1998 | Yee et al. ............... 342/357.07 |
| 5,924,023 A | * | 7/1999 | Smith et al. ............. 455/226.3 |
| 6,175,327 B1 | * | 1/2001 | Lin et al. ................ 342/357.06 |
| 6,407,699 B1 | * | 6/2002 | Yang ...................... 342/357.12 |
| 6,448,925 B1 | * | 9/2002 | Shridhara .............. 342/357.12 |
| 6,639,541 B1 | * | 10/2003 | Quintana et al. ...... 342/357.12 |
| 6,697,415 B1 | * | 2/2004 | Mahany ...................... 375/130 |
| 2001/0055952 A1 | * | 12/2001 | Ficarra ....................... 455/67.3 |
| 2002/0142744 A1 | | 10/2002 | Okanoue et al. |
| 2003/0054756 A1 | | 3/2003 | Tyson |
| 2003/0114983 A1 | * | 6/2003 | Irvin et al. .................. 701/214 |
| 2004/0239559 A1 | * | 12/2004 | King et al. ............ 342/357.12 |
| 2004/0266342 A1 | * | 12/2004 | Kontola et al. ............ 455/12.1 |

OTHER PUBLICATIONS

Wikipedia, The Free Encyclopedia, "Noise floor", at http://en.wikipedia.org/wiki/Noise_floor.*
Fiber Optic Power Meter FPM-8200 User's Guide, ILX Lightwave, http://www.ilxlightwave.com/manuals/fiber_optic_power_meter_FPM-8200_manual.pdf, p. 70.*
European Search Report dated Aug. 17, 2004, for European Patent Application No. 04102571.9-2220-.

* cited by examiner

*Primary Examiner*—Thomas H. Tarcza
*Assistant Examiner*—Fred H. Mull
(74) *Attorney, Agent, or Firm*—Hunton & Williams LLP (57) ABSTRACT

A method and system for detecting GPS interference is disclosed. In one exemplary embodiment, a method for detecting interference in a Global Positioning System comprises the steps of receiving at least one satellite signal from one or more satellites in a Global Positioning System; identifying a noise floor value from the at least one satellite signal; identifying an interference signal based on the noise floor value; determining an interference value for the interference signal from the noise floor value wherein a level of the noise floor value corresponds to a level of interference; and providing the interference value to at least one user for informing the user of the interference signal.

31 Claims, 4 Drawing Sheets

METHOD AND SYSTEM FOR DETECTING INTERFERENCE FOR GLOBAL POSITIONING SYSTEMS

FIELD OF THE INVENTION

The present invention relates generally to detecting interference for Global Positioning Systems, and more particularly, to a method and system for detecting interference for Global Positioning Systems based on noise floor values corresponding to interference levels.

BACKGROUND OF THE INVENTION

Global Positioning System generally involves a system for determining a position on the Earth's surface by comparing radio signals from several satellites. The system essentially comprises 24 satellites equipped with radio transmitters and atomic clocks. Depending on a geographic location, a GPS receiver samples data from the satellites and calculates the time for each satellite signal to reach the GPS receiver. From the difference in time of reception, the location may be determined. The GPS generally represents a constellation of 24 satellites that orbit the Earth where ground receivers are able to pinpoint a precise geographic location. The location accuracy may range from anywhere from 10 to 100 meters.

The GPS is owned and operated by the United States Department of Defense but is available for general use around the world. Twenty one GPS satellites and three spare satellites are in orbit above the Earth. The satellites are spaced so that from any point on Earth, four satellites will be above the horizon. Each satellite contains a computer, an atomic clock and a radio. With an understanding of its own orbit and the clock, each satellite continually broadcasts its changing position and time. Periodically (e.g., daily), each satellite will checks its own time and position with a ground station and makes any minor correction, if necessary. On the ground, any GPS receiver may contain a computer that triangulates its own position from information provided by a plurality of satellites (e.g., three to four satellites). The result is provided in the form of a geographic position (e.g., longitude and latitude). If the receiver is also equipped with a display screen that shows the map, the position can be shown on the map. In addition, an altitude reading may also be provided.

There are many instances where the GPS satellite signal may be interfered with or otherwise compromised. Generally, the user will experience a delay, difficulty in receiving a reading or data that is incorrect or misleading. The user is essentially unaware of the cause, an amount of interference or even the presence of interference. For example, the user may be completely unaware that the signal is being interfered with and may rely on delayed signals or inaccurate data. Therefore, as the user is unaware of interference detection, the user does not have the information to compensate for the interference.

In view of the foregoing, it would be desirable to provide a technique for detecting GPS interference which overcomes the above-described inadequacies and shortcomings.

SUMMARY OF THE INVENTION

According to an embodiment of the present invention, a method and a system detects interference in a Global Positioning System. According to an exemplary embodiment of the present invention, a method for detecting interference in a Global Positioning System comprises the steps of receiving at least one satellite signal from one or more satellites in a Global Positioning System; identifying a noise floor value from the at least one satellite signal; identifying an interference signal based on the noise floor value; determining an interference value for the interference signal from the noise floor value wherein a level of the noise floor value corresponds to a level of interference; and providing the interference value to at least one user for informing the user of the interference signal.

According to other aspects of this particular exemplary embodiment of the present invention, in the method described above, the interference value comprises a percentage between 0% and 100% representing a percentage of interference; the interference value represents an average interference value for the one or more satellites; the interference signal comprises one or more of a jamming signal and a spoofing signal; the method further comprises the step of providing the interference value to one or more recipients other than the at least one user for informing the one or more recipients of the interference signal via radio transmission; the one or more recipients comprise one or more of a ground unit, an airborne unit, an equipment unit, and a vehicle sensor unit; the method further comprises the steps of determining an interference strength of the interference signal and providing the interference strength of the interference signal to the at least one user; the method further comprises the steps of determining an interference direction of the interference signal and providing the interference direction of the interference signal to the at least one user; the step of receiving is performed at a search and rescue radio; the step of providing the interference value further comprises the step of displaying the interference value to the at least one user via a user interface; the method further comprises the step of displaying a graphical representation of the interference value; the method further comprises the step of triggering the user to switch to an alternative mode of position location, in response to being informed of the interference signal; the alternative mode of operation comprises distance measuring equipment (DME) mode; the method further comprises the step of triggering the user to block the interference signal, in response to being informed of the interference signal; and the method further comprises the steps of transmitting the interference value to a central unit wherein the central unit receives a plurality of interference values from a plurality of other users and determining a source location of the interfering signal based at least in part on the interference value from the user and the one or more interference values from the plurality of other users.

According to another exemplary embodiment of the present invention, a system for detecting interference in a Global Positioning System comprises a receiving module for receiving at least one satellite signal from one or more satellites in a Global Positioning System; a noise floor module for identifying a noise floor value from the at least one satellite signal; a detection module for identifying an interference signal based on the noise floor value and determining an interference value for the interference signal from the noise floor value wherein a level of the noise floor value corresponds to a level of interference; and a notification module for providing the interference value to at least one user for informing the user of the interference signal.

According to another exemplary embodiment of the present invention, at least one processor readable carrier for storing a computer program of instructions configured to be readable by at least one processor for instructing the at least one processor to execute a computer process for performing the method as recited above.

According to another exemplary embodiment of the present invention, at least one signal embodied in at least one carrier wave for transmitting a computer program of instructions configured to be readable by at least one processor for instructing the at least one processor to execute a computer process for detecting interference in a Global Positioning System, the computer process comprising a receiving means for receiving at least one satellite signal from one or more satellites in a Global Positioning System; a noise floor identifying means for identifying a noise floor value from the at least one satellite signal; an interference identifying means for identifying an interference signal based on the noise floor value; an interference determining means for determining an interference value for the interference signal from the noise floor value wherein a level of the noise floor value corresponds to a level of interference; and a notification means for providing the interference value to at least one user for informing the user of the interference signal.

According to another exemplary embodiment of the present invention, an article of manufacture for detecting interference in a Global Positioning System, the article of manufacture comprising at least one processor readable carrier; and instructions carried on the at least one carrier; wherein the instructions are configured to be readable from the at least one carrier by at least one processor and thereby cause the at least one processor to operate so as to: receive at least one satellite signal from one or more satellites in a Global Positioning System; identify a noise floor value from the at least one satellite signal; identify an interference signal based on the noise floor value; determine an interference value for the interference signal from the noise floor value wherein a level of the noise floor value corresponds to a level of interference; and provide the interference value to at least one user for informing the user of the interference signal.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modification, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

According to an embodiment of the present invention, a method and system detects interference in a Global Positioning System (GPS). In particular, a noise floor associated with a received satellite signal may be used to determine an interference level. Further, an interference percentage, an interference strength, an interference source direction and/or other information associated with the detected GPS interference may be determined. Interference may include jamming signals, spoofing signals, other signals that may interfere with receiving the satellite signal and/or other types of interference. A user and other recipients may receive notification of the GPS interference. In addition, the user may notify other recipients when the GPS signal is being interfered with and/or when the interference is gone.

The GPS interference detection of an embodiment of the present invention aids the user in taking steps to address and/or minimize the interference with such techniques as body shielding, antenna rotation, relocation (e.g., moving behind a hill) and/or switching to a different mode of position location or other appropriate response. The user may also transmit the interference level to a central location that collects interference information from a plurality of users to determine the direction and/or location of the interference. An embodiment of the present invention provides data, such as mission critical data, to the user and/or other recipients for providing the status of the GPS signal quality. This data may be used to aid a variety of missions and applications. For example, interference values from more than one receiver (e.g., GPS radio, etc.) may be collected to determine the location of the interference signal (e.g., jamming signal, etc.) through triangulation.

Figure 1:
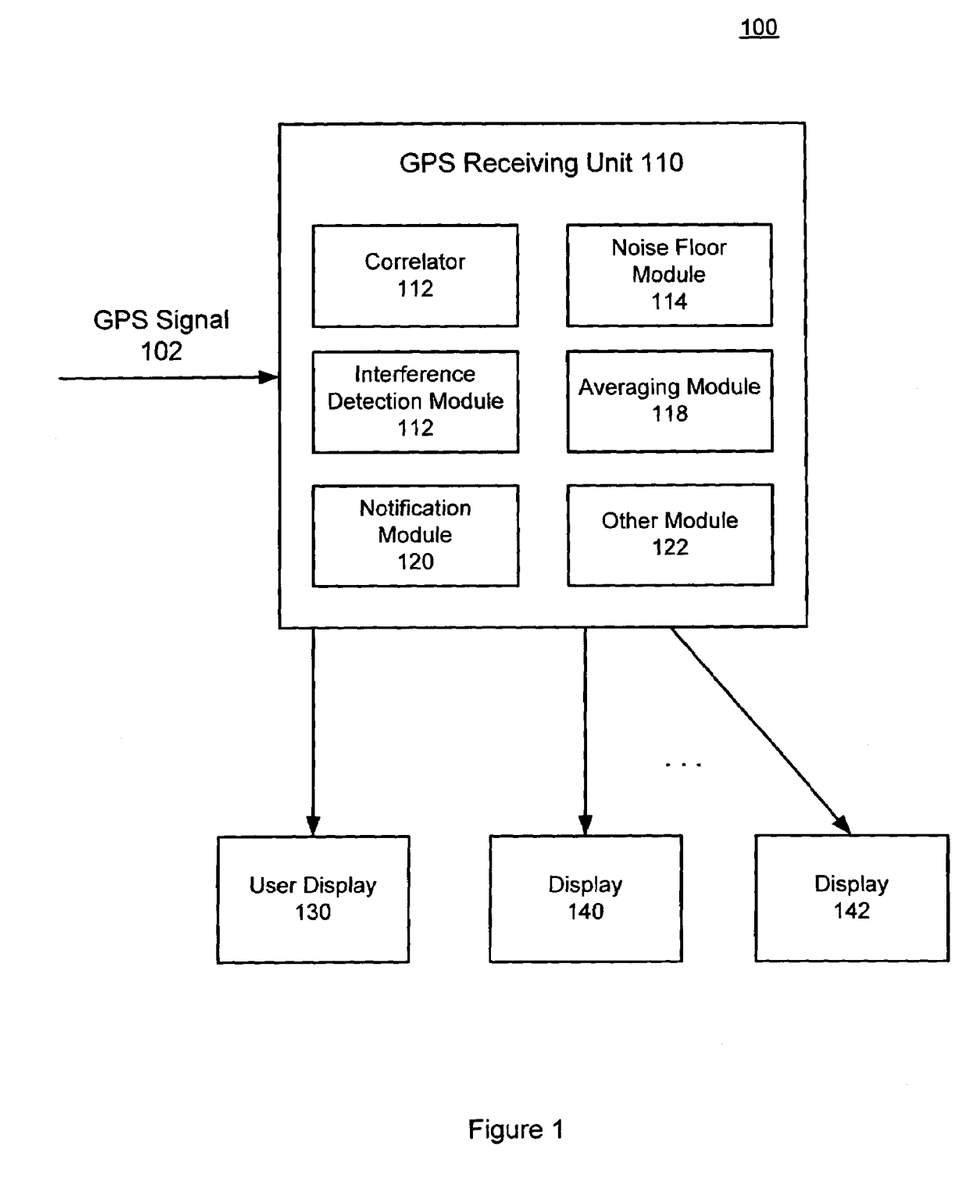
FIG. 1 is a diagram of a system for detecting GPS interference, according to an embodiment of the present invention.

FIG. 1 is a diagram of a system for detecting GPS interference, according to an embodiment of the present invention. System 100 may provide various functions, such as detection of interference, calculation of interference strength, notification to the user and notification to other recipients of the detection of interference and other data, such as interference level. In particular, GPS receiving unit 110 may include a correlator 112, a noise floor module 114, an interference detection module 116, an averaging module 118, a notification module 120 and other module 122. Other functionality associated with GPS interference detection may also be supported by GPS receiving unit 110.

GPS signal 102 may be received by a GPS receiver at GPS receiving unit 110. GPS signal 102 may represent one or more GPS signals from a satellite. GPS receiving unit 110 may represent a receiver for continuously monitoring GPS signal quality. For example, the receiver may include various models and types of GPS receivers, such as a GPS radio, a search and rescue radio, a combat search and rescue radio or other GPS receiver. When the receiver detects that a level of interference impedes or prevents receiving valid GPS coordinates, the receiver may automatically notify the user via an interface (e.g., a display). For example, the interface may display that a 2D and/or 3D position lock can no longer be achieved. The interface may further display an indication of interference, such as a percentage of interference or other representation of interference. The user may also choose to send a message indicating GPS interference to other users (e.g., ground users) with a receiver, such as search and rescue radio, aircraft users and/or other intended recipients. Once the interference level drops and the GPS unit is able to obtain a 2D and/or 3D position lock, the user may be notified via the interface and may further notify the other recipients that interference has dissipated.

The GPS interference detection system and method of an embodiment of the present invention may detect an interference signal and provide data, such as an interference strength. GPS satellite signals 102, when received by GPS receiving unit 110, may appear as random values. These seemingly random values may be referred to as noise. Noise values are constantly changing and may be referred to as a noise floor. Noise values may represent interference while the noise floor may represent increases and decreases in intensity of the interference. A GPS receiving unit 110 of an embodiment of the present invention may include a correlator 112 for implementing a correlation technique for detecting a known waveform within the noise floor. Each satellite may have an associated known waveform where the known waveform for each satellite may be detected by correlator 112. The noise floor may produce distinctive characteristics when an interference signal is broadcast near a carrier wave, such as GPS's L1 signal of 1575.42 MHz. The noise floor of the GPS satellite signal may be identified by noise floor module 114. According to an embodiment of the present invention, GPS interference may be detected and calculated by characterizing the noise floor. The noise floor may be characterized to understand the various noise levels when varying interference signals are present. Varying noise floor levels may be characterized to represent varying interference levels. Thus, for a particular noise floor, a corresponding interference level may be identified.

Interference detection module 116 may calculate an interference percentage, an interference source direction, an interference strength and/or other characteristics. According to an example, an interference level may represent a percentage between 0% to 100%. In particular, a relationship between noise floor levels and the amount of interference may be calculated to represent a value from 0% to 100%. For example, interference levels approximately above 40% to 50% may be determined to prevent the GPS receiver from acquiring valid satellite signals. Interference levels approximately between 30% to 40% may allow satellites that have already been locked to remain locked where a GPS position lock will not be/remain acquired. The varying exemplary ranges are due to slight differences between receivers and the differences in the GPS satellites' signal strengths. Other ranges and representations of interference may be implemented in accordance with an embodiment of the present invention.

According to another embodiment of the present invention, the GPS interference detection system and method may determine a source direction of the detected interference. Through a rotation of a receiver (e.g., a search and rescue radio), the user may determine an approximate direction of an interference source. For example, holding the receiver (e.g., a search and rescue radio) in a vertical position with a GPS antenna pointing toward the user but with the unit at arms reach and with the user slowly turning 360° while monitoring the interference level displayed, the user may determine an approximate direction of the GPS interference source. Provided that the interference strength is not greater than a threshold amount (e.g., 85%), the user may notice that the interference strength differs depending on which direction the GPS antenna is facing. The direction of the GPS antenna exhibiting a maximum level of interference detected is likely the direction of the source of interference. The receiver may provide this capability through a metal shell acting as a shield to the GPS interference source.

Each GPS satellite channel may be uniquely affected by the interference signal and a percentage of interference value may be calculated from 0% to 100%. According to another example, based on a lack of correlation, a channel experiencing interference may be identified. For example, if a signal is being interfered with (e.g., jammed, spoofed, etc.), data may not be correlated. In particular, spoofed data will not match various parameters, such as pseudorandom noise (pn) sequence, almanac, etc. By utilizing the lack of correlation, channels that are being interfered with (e.g., jammed, spoofed, etc.) may be identified.

Each satellite's percentage value may be averaged together to produce an average percentage representation, as calculated by averaging module 118. A user and other intended recipients may be informed of a detected interference. For example, a final averaged percentage of interference may be displayed to the user and other intended recipients, via notification module 120, where an interference percentage or other characteristic may be displayed to a user via a user interface or user display 130. Other intended recipients may also be notified by an interface, such as display 140, 142. Examples of recipients may include an airborne unit, a ground unit, missiles, fuses, vehicle sensors and other recipients. The interference detection and/or other interference data may be communicated to the user and/or other recipients via radio transmission. For example, this capability provides users and/or recipients a source of information for determining tactics and procedures.

Figure 2:
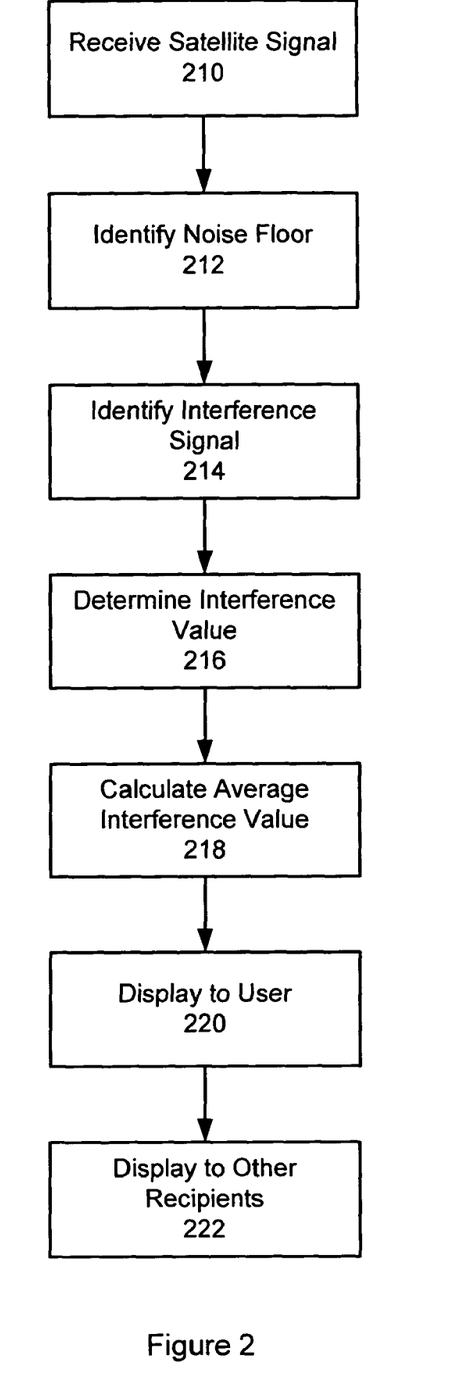
FIG. 2 is a flowchart illustrating a method for detecting GPS interference, according to an embodiment of the present invention.

FIG. 2 is a flowchart illustrating a method for detecting GPS interference, according to an embodiment of the present invention. At step 210, a receiving unit may receive a satellite signal. The satellite signal may represent multiple frequencies or a frequency band. At step 212, a noise floor may be identified from the satellite signal. According to an embodiment of the present invention, the noise floor may be characterized to represent a level of interference. Based on the noise floor, a corresponding level of interference may be identified. At step 214, an interference signal may be identified by the noise floor. For example, the interference signal may represent a jammed signal, a spoofed signal or other type of interference signal. At step 216, an interference value, such as an interference percentage of other measure or representation of interference may be determined. For example, the noise floor may be characterized to represent a percentage of interference. At step 218, for a plurality of satellites, an average value of the interference percentage of the plurality of satellites may be calculated. As each satellite provides a different perspective, an average value provides a composite representation of the GPS interference. At step 220, the average value may be displayed to the user. At step 222, the average value may be displayed to other recipients.

Figure 3:
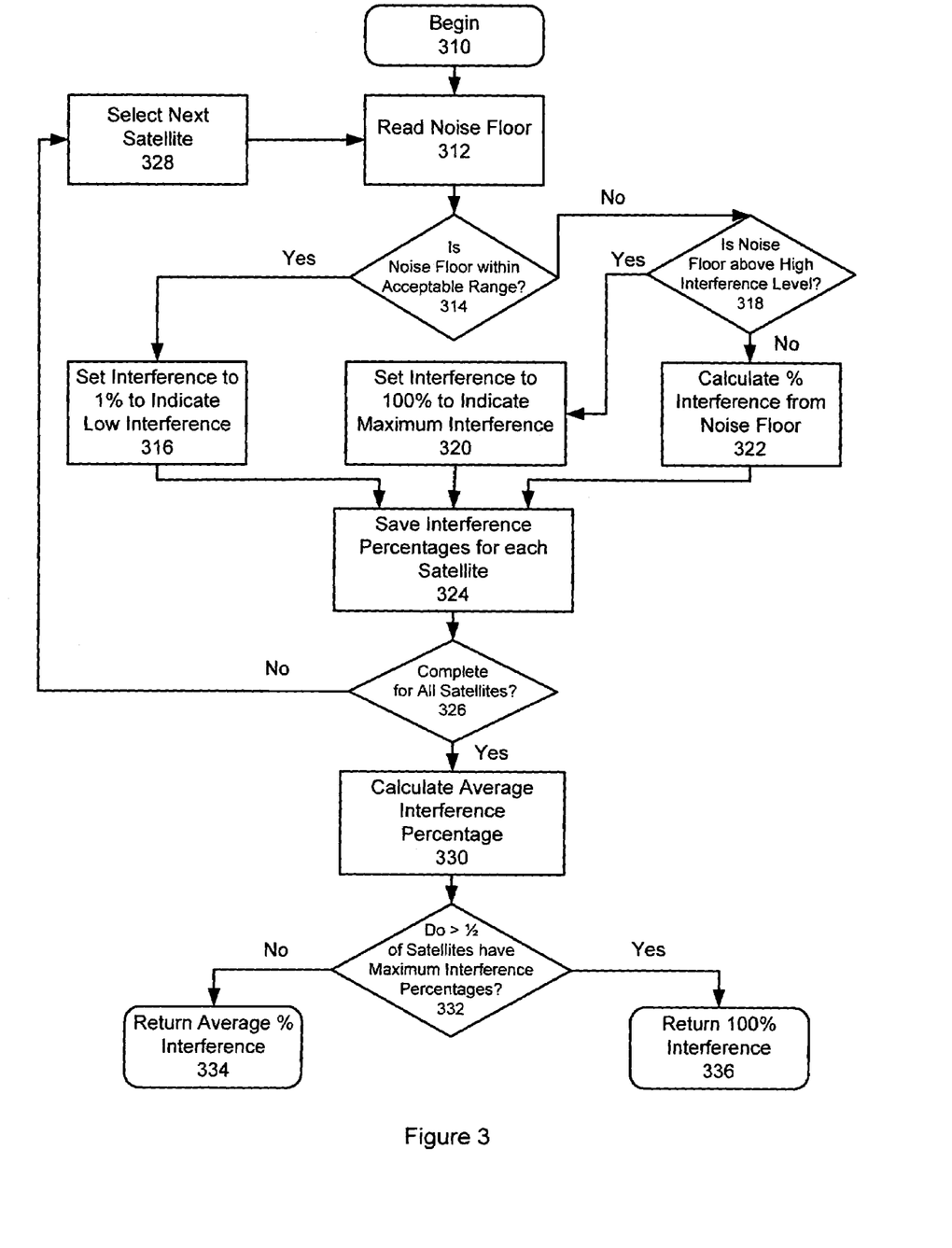
FIG. 3 is a flowchart illustrating a method for detecting GPS interference, according to an embodiment of the present invention.

FIG. 3 is a flowchart illustrating a method for detecting GPS interference, according to an embodiment of the present invention. Step 310 indicates a start of a GPS interference detection process. At step 312, a noise floor for the satellite signal received by a receiver may be identified. The noise floor may be read from correlation data. For example, satellite signals from satellites in search or acquire modes may be received. At step 314, it may be determined whether the noise floor is within an acceptable range. If the noise floor is within an acceptable range, an interference level may be set to a predetermined percentage (e.g., approximately 1%) to indicate a low interference, at step 316. Other percentages or values may be used to indicate a low interference. If the noise floor is determined to be outside the acceptable range at step 314, it may be determined whether the noise floor is above a predetermined high interference level, at step 318. The high interference level may indicate a situation where the GPS receiver can not receive a readable signal, a situation where the signals are substantially blocked or other similar high interference situation. If the noise floor is determined to be above the high interference level, the interference level may be set to a predetermined percentage (e.g., approximately 100%) to indicate high interference, at step 320. Other percentages or values may be used to indicate high interference. If the noise floor is determined to be outside the acceptable range and less than the high interference level, the interference percentage may be calculated from the noise floor, at step 322. The interference percentages may be saved for each satellite, at step 324. At step 326, it may be determined whether interference detection has been completed for all satellites. If not, the process is repeated for each satellite, as shown by step 328. Each satellite offers a different perspective of the position location. Therefore, an average interference percentage may be calculated to provide a comprehensive interference reading. At the completion of the process for each satellite, an average interference percentage may be calculated, at step 330. At step 332, it may be determined whether a half (or other predetermined number or percentage) of the satellites have a maximum interference percentage. If less than half of the satellites have a maximum interference percentage value, an average percentage of interference may be displayed, at step 334. If more than half of the satellites have a maximum interference percentage value, a predetermined interference value (e.g., 100%) may be displayed, at step 336. In this example, percentage values have been used to indicate interference values. However, other representations of interference may be implemented in accordance with an embodiment of the present invention.

Figure 4:
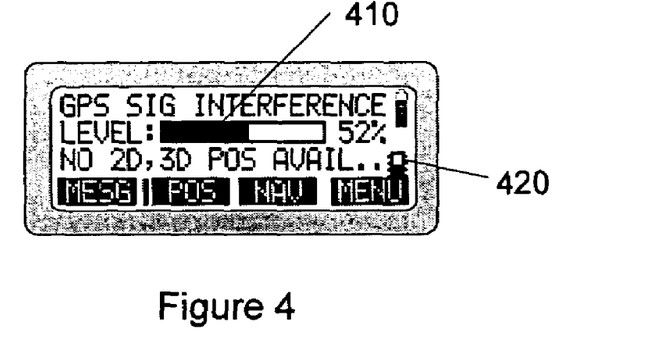
FIG. 4 is an illustration of a user interface for displaying GPS interference data, according to an embodiment of the present invention.

FIG. 4 is an illustration of a user interface for displaying GPS interference data, according to an embodiment of the present invention. When the GPS interference level is detected to be greater than or equal to a predetermined level, such as 37%, and the receiver unit does not have a 2D or 3D GPS position lock, a GPS interference screen may be displayed. In a particular example, the GPS interference screen may replace a normal top level display screen. FIG. 4 is an example of a GPS interference screen. In this exemplary GPS interference screen, the user may be notified that GPS signal interference is detected and 2D and 3D position is not available. A bar graph 410 may be displayed along with a percentage of interference (e.g., 52%) allowing the user to quickly assess GPS interference.

To prevent the display screen from flickering back and forth between the GPS interference screen and a normal Satellite Display Screen when the interference level fluctuates around a predetermined range, such as 35–37%, the GPS interference screen may not be removed until the level drops down to a predetermined threshold, such as 34%.

According to another example, the GPS interference screen may not be displayed based on certain conditions, such as a 2D or 3D position lock, regardless of the level of interference. This may be useful because as long as there is a position lock, the GPS unit is still operating as expected and therefore the position data is valid.

A GPS interference gauge indicator may be displayed, as shown by 420. The GPS indicator allows the user to determine an approximate level of GPS interference regardless of what menu or screen is currently accessed or displayed. For example, each line of the GPS indicator may equate to approximately 14% and may be completely filled in once the percentage level reaches a predetermined threshold, such as 86% or higher. Other graphical displays and variations thereof may be implemented.

Figure 5:
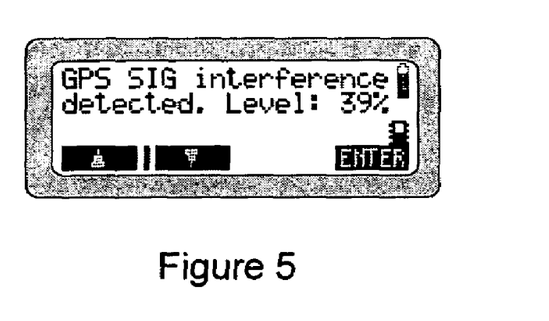
FIG. 5 is an illustration of an interface for displaying GPS interference data, according to an embodiment of the present invention.
Figure 6:
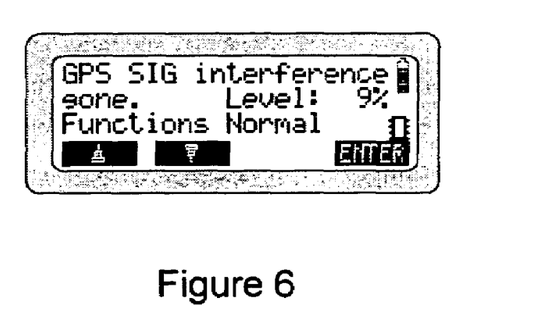
FIG. 6 is an illustration of an interface for displaying GPS interference data, according to an embodiment of the present invention.

Other recipients may be notified of detected GPS interference, GPS interference levels and/or other data. FIG. 5 is an illustration of an interface for displaying GPS interference data, according to an embodiment of the present invention. FIG. 6 is an illustration of another interface for displaying GPS interference data, according to an embodiment of the present invention. For example, the user may send pre-programmed text messages indicating detected GPS interference to one or more intended recipients. An exemplary message to indicate the presence of interference is shown in FIG. 5 and another exemplary message to indicate that the interference is gone is shown in FIG. 6.

According to another example, the percentage of GPS interference detected may be embedded into the messages. The interference information may be updated each time the user sends the message to ensure accurate information is transmitted. For example, if the user has a message stored in memory and presses a send key without looking at the saved message, the percentage of interference will still be updated regardless of what was saved in memory. Otherwise, old data could be mistakenly sent.

The messages may be formatted to allow for receiver units with older versions of software to receive the GPS interference messages. Rather than sending a message index representing the message to send, the actual text may be sent each time. This allows for older receiver units that would not know about this new message index type to receive the messages thereby preventing or minimizing logistics problems of having to update every receiver unit.

When choosing a message, the percentage of interference may be dynamically updated on a screen at set intervals, such as one-second intervals. This allows for the user to cancel the sending of the message if the interference level changes while selecting the message to send. If the interference level were static, the user could send an incorrect notification.

The GPS interference detection system and method of an embodiment the present invention provides a warning of interference and enables a user to switch to another mode of position location, such as Distance Measuring Equipment (DME) mode. The GPS interference detection system and method of an embodiment of the present invention may trigger a blocking mechanism, such as body shielding (or moving behind a tree or a hill, etc.), to block the interference based on an indication of interference as well as the level of interference.

The functionality associated with the GPS interference detection, as discussed above, may be represented as software code and/or hardware structure. Further, detecting GPS interference in accordance with the present invention as described above typically involves the processing of input data and the generation of output data to some extent. This input data processing and output data generation may be implemented in hardware or software. For example, specific electronic components may be employed in a hardware or similar or related circuitry for implementing the functions associated with detecting GPS interference in accordance with the present invention as described above. Alternatively, one or more processors operating in accordance with stored instructions may implement the functions associated with detecting GPS interference in accordance with the present invention as described above. If such is the case, it is within the scope of the present invention that such instructions may be stored on one or more processor readable carriers (e.g., a magnetic disk), or transmitted to one or more processors via one or more signals.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

The invention claimed is:

1. A method for detecting interference in a Global Positioning System, the method comprising the steps of:
   receiving at least one satellite signal from one or more satellites in a Global Positioning System;
   measuring a noise floor value in a frequency band of the at least one satellite signal;
   identifying an interference signal based on the noise floor value wherein the interference signal is determined by a comparison between the noise floor value from the at least one satellite signal and a predetermined acceptable range;
   determining an interference value for the interference signal from the noise floor value wherein a level of the noise floor value corresponds to a level of interference; wherein the comparison between the noise floor value and the predetermined acceptable range determines a corresponding interference value for the interference signal;
   wherein if the noise floor value is within the predetermined acceptable range, the interference value is set at a predetermined low interference value;
   wherein if the noise floor value is outside the predetermined acceptable range, the noise floor value is set at a predetermined high interference value; and
   providing the interference value to at least one user for informing the user of the interference signal.

2. The method of claim 1, wherein the interference value comprises a percentage between 0% and 100% representing a percentage of interference of the interference signal on maintaining a GPS signal lock.

3. The method of claim 1, wherein the interference value represents an average interference value for the one or more satellites.

4. The method of claim 1, wherein the interference signal comprises one or more of a jamming signal and a spoofing signal.

5. The method of claim 1, further comprising the step of:
   providing the interference value to one or more recipients other than the at least one user for informing the one or more recipients of the interference signal via radio transmission.

6. The method of claim 5, wherein the one or more recipients comprise one or more of a ground unit, an airborne unit, an equipment unit, and a vehicle sensor unit.

7. The method of claim 1, further comprising the steps of:
   determining an interference strength of the interference signal; and
   providing the interference strength of the interference signal to the at least one user.

8. The method of claim 1, further comprising the steps of:
   determining an interference direction of the interference signal; and
   providing the interference direction of the interference signal to the at least one user.

9. The method of claim 1, wherein the step of receiving is performed at a search and rescue radio.

10. The method of claim 1, wherein the step of providing the interference value further comprises the step of:
    displaying the interference value to the at least one user via a user interface.

11. The method of claim 10, further comprising the step of:
    displaying a graphical representation of the interference value.

12. The method of claim 1, further comprising the step of:
    triggering the user to switch to an alternative mode of position location, in response to being informed of the interference signal.

13. The method of claim 12, wherein the alternative mode of operation comprises distance measuring equipment (DME) mode.

14. The method of claim 1, further comprising the step of:
    triggering the user to block the interference signal, in response to being informed of the interference signal.

15. The method of claim 1, further comprising the steps of:
    transmitting the interference value to a central unit wherein the central unit receives a plurality of interference values from a plurality of other users; and
    determining a source location of the interfering signal based at least in part on the interference value from the user and the one or more interference values from the plurality of other users.

16. A system for detecting interference in a Global Positioning System, the system comprising:
    a receiving module for receiving at least one satellite signal from one or more satellites in a Global Positioning System;
    a noise floor module for measuring a noise floor value in a frequency band of the at least one satellite signal;
    a detection module for identifying an interference signal based on the noise floor value wherein the interference signal is determined by a comparison between the noise floor value from the at least one satellite signal and a predetermined acceptable range and determining an interference value for the interference signal from the noise floor value wherein a level of the noise floor value corresponds to a level of interference; wherein the comparison between the noise floor value and the predetermined acceptable range determines a corresponding interference value for the interference signal;
    wherein if the noise floor value is within the predetermined acceptable range, the interference value is set at a predetermined low interference value;
    wherein if the noise floor value is outside the predetermined acceptable range, the noise floor value is set at a predetermined high interference value; and a notification module for providing the interference value to at least one user for informing the user of the interference signal.

17. The system of claim 16, wherein the interference value comprises a percentage between 0% and 100% representing a percentage of interference of the interference signal on maintaining a GPS signal lock.

18. The system of claim 16, wherein the interference value represents an average interference value for the one or more satellites.

19. The system of claim 16, wherein the interference signal comprises one or more of a jamming signal and a spoofing signal.

20. The system of claim 16, wherein the interference value is provided to one or more recipients other than the at least one user for informing the one or more recipients of the interference signal via radio transmission.

21. The system of claim 20, wherein the one or more recipients comprise one or more of a ground unit, an airborne unit, an equipment unit, and a vehicle sensor unit.

22. The system of claim 16, wherein the detection module further determines an interference strength of the interference signal; and the notification module further provides the interference strength of the interference signal to the at least one user.

23. The system of claim 16, wherein the detection module further determines an interference direction of the interference signal; and the notification module further provides the interference direction of the interference signal to the at least one user.

24. The system of claim 16, wherein the system comprises a search and rescue radio.

25. The system of claim 16, further comprises a user display for displaying the interference value to the at least one user via a user interface.

26. The system of claim 25, wherein the user display displays a graphical representation of the interference value.

27. The system of claim 16, wherein the user switches to an alternative mode of position location, in response to being informed of the interference signal.

28. The system of claim 27, wherein the alternative mode of operation comprises distance measuring equipment (DME) mode.

29. The system of claim 16, wherein the user blocks the interference signal, in response to being informed of the interference signal.

30. The system of claim 16, wherein the interference value is transmitted to a central unit wherein the central unit receives a plurality of interference values from a plurality of other users; and a source location of the interfering signal is determined based at least in part on the interference value from the user and the one or more interference values from the plurality of other users.

31. An article of manufacture for detecting interference in a Global Positioning System, the article of manufacture comprising:

at least one processor readable carrier; and instructions carried on the at least one carrier;

wherein the instructions are configured to be readable from the at least one carrier by at least one processor and thereby cause the at least one processor to operate so as to:

receive at least one satellite signal from one or more satellites in a Global Positioning System;

measure a noise floor value in a frequency band of the at least one satellite signal;

identify an interference signal based on the noise floor value wherein the interference signal is determined by a comparison between the noise floor value from the at least one satellite signal and a predetermined acceptable range;

determine an interference value for the interference signal from the noise floor value wherein a level of the noise floor value corresponds to a level of interference; wherein the comparison between the noise floor value and the predetermined acceptable range determines a corresponding interference value for the interference signal;

wherein if the noise floor value is within the predetermined acceptable range, the interference value is set at a predetermined low interference value;

wherein if the noise floor value is outside the predetermined acceptable range, the noise floor value is set at a predetermined high interference value; and provide the interference value to at least one user for informing the user of the interference signal.

* * * * *